United States Patent [19]

Horikawa

[11] Patent Number: 4,999,838
[45] Date of Patent: Mar. 12, 1991

[54] FAILURE RECOVERY INFORMING ARRANGEMENT WITH SIMPLIFIED HARDWARE IN A DATA PROCESSING SYSTEM

[75] Inventor: Akinori Horikawa, Tokyo, Japan

[73] Assignee: NEC Corporation, Tokyo, Japan

[21] Appl. No.: 221,553

[22] Filed: Jul. 20, 1988

[30] Foreign Application Priority Data

Jul. 21, 1987 [JP] Japan .............................. 62-180108

[51] Int. Cl.[5] ............................................. G06F 11/00
[52] U.S. Cl. .................................. 371/16.1; 364/200; 371/14
[58] Field of Search .................... 371/12, 16, 16.1, 14; 364/200 MS File

[56] References Cited

U.S. PATENT DOCUMENTS 4,048,481 9/1977 Bailey, Jr. et al. .................. 371/16
4,521,847 6/1985 Ziehm et al. ......................... 371/12

*Primary Examiner*—Charles E. Atkinson
*Attorney, Agent, or Firm*—Foley & Lardner Schwartz, Jeffery, Schwaab, Mack, Blumenthal & Evans

[57] ABSTRACT

When a peripheral control processor is put, in a data processing system, into a down state from a normal state of operation upon occurrence of a failure, a failure recovery informing arrangement comprises a failure occurrence signal producing circuit for delivering a failure occurrence signal to a diagnostic bus. Detecting the failure occurrence signal, a detecting circuit delivers a detection signal to a system bus. Responsive to the detection signal, a recovery command signal producing circuit delivers a recovery command signal back to the system bus rather than, through a specific hardware line, directly to the peripheral control processor. Instead of the specific hardware line, a processing circuit is used in processing the recovery command signal into a peripheral initializing signal and a recovery informing signal to supply them to the peripheral control processor through the diagnostic bus. The initializing signal is for turning the down state to the normal state. The informing signal informs that the down state is turned back to the normal state. Upon occurrence of a system failure, a start signal is manually or otherwise supplied to the processing circuit and processed into a system initializing signal and a start information signal which are delivered to the peripheral control processor like the peripheral initializing and the recovery informing signals. Preferably, a diagnostic test program is preliminarily memorized in the peripheral control processor and is used in response to the initializing and the informing signals in turning the down state to the normal state.

6 Claims, 2 Drawing Sheets

FAILURE RECOVERY INFORMING ARRANGEMENT WITH SIMPLIFIED HARDWARE IN A DATA PROCESSING SYSTEM

BACKGROUND OF THE INVENTION

This invention relates to a failure recovery arrangement for use in a data processing system.

A data processing system of the type described, comprises a system bus, a local bus, and at least one peripheral control processor. The peripheral control processor is operable in a normal state of operation and is put into a down state when a failure occurs during progress of the normal state.

A conventional failure recovery informing arrangement comprises a failure occurrence signal producing circuit. Connected to the peripheral control processor and to a first signal transmission line, the failure occurrence signal producing circuit detects the downstate of the peripheral control processor and produces a failure occurrence signal, indicative of occurrence of the failure, and delivers the failure occurrence signal to the first signal transmission line.

An input-output processor is connected to the first signal transmission line. Responsive to the failure occurrence signal, the input-output processor produces a recovery command signal and delivers the recovery command signal to the peripheral control processor through a second signal transmission line connected between the input-output processor and the peripheral control processor. The recovery command signal comprises an initializing signal and an informing signal.

Supplied to the peripheral control processor through the second signal transmission line, the initializing signal is for turning the down state back to the normal state. The peripheral control processor has to obtain the informing signal which informs that the down state is turned back to the normal state after occurrence of the failure. This is because the peripheral control processor supplies the input-output processor with a completion signal representative of complete recovery of the failure after the peripheral control processor is turned back to the normal state. The reason will become clear later in the description why the peripheral control processor must deliver the completion signal to the input-output processor.

Although the input-output processor is connected to the peripheral control processor through the abovementioned local bus, it is impossible to use the local bus in supplying the recovery command signal from the input-output processor to the peripheral control processor before the peripheral control processor is turned back to the normal state. Provision of the second signal transmission line renders hardware of the failure recovery informing arrangement complicated.

SUMMARY OF THE INVENTION

It is therefore an object of the present invention to provide a failure recovery informing arrangement which includes a reduced amount of hardware.

It is another object of this invention to provide a failure recovery informing arrangement of the type described, which comprises simplified hardware.

It is still another object of this invention to provide a failure recovery informing arrangement of the type described, which is capable of removing a signal transmission line for transmission of an initializing signal for turning a down state back to a normal state and for transmission of an informing signal informing that the down state is turned back to the normal state after occurrence of a failure of a peripheral control processor.

Other objects of this invention will become clear as the description proceeds.

On describing the gist of this invention, it is possible to understand that a failure recovery informing arrangement is for use in a data processing system comprising a system bus, a diagnostic bus, and a peripheral control processor connected to the diagnostic bus, operable in a normal state of operation, and put into a down state upon occurrence of a failure.

According to this invention, the above-mentioned failure recovery informing arrangement comprises: (1) failure occurrence signal producing means connected to the peripheral control processor and to the diagnostic bus for producing a failure occurrence signal, indicative of occurrence of the failure to deliver the failure occurrence signal to the diagnostic bus; (2) a diagnostic processor connected to the system bus and to the diagnostic bus for detecting the failure occurrence signal to deliver a detection signal to the system bus upon detection of the failure occurrence signal; and (3) recovery command signal producing means connected to the system bus for producing a recovery command signal in response to the detection signal to deliver the recovery command signal back to the system bus, said diagnostic processor for processing the recovery command signal into a peripheral initializing signal and a recovery informing signal to deliver the peripheral initializing and the recovery informing signals to the peripheral control processor. The peripheral initializing signal is for turning the down state back to the normal state. The recovery informing signal informs that the down state is turned back to the normal state as a result of occurrence of the failure.

Figure 1:
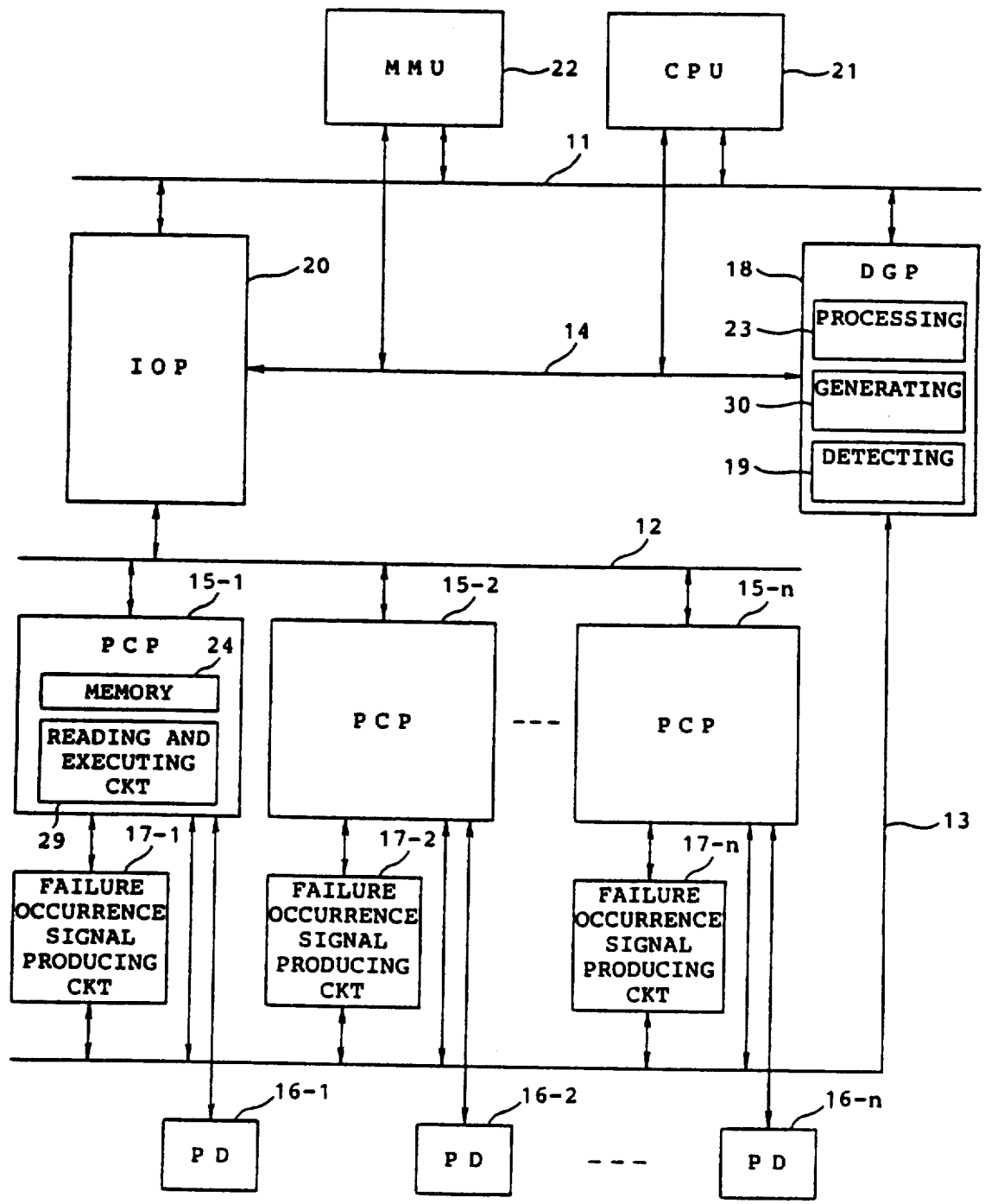
FIG. 1 is a block diagram of a data processing system comprising a failure recovery informing arrangement according to an embodiment of this invention.

DESCRIPTION OF THE PREFERRED EMBODIMENT:

Referring to FIG. 1, a failure recovery arrangement according to a preferred embodiment of this invention is for use in a data processing system which comprises a system bus 11, a local bus 12, first and second diagnostic buses 13 and 14, and first through n-th peripheral control processors 15-1, 15-2, . . . , and 15-n, each of which is labelled "PCP". Each of the peripheral control processors 15 (suffixes omitted) is a processor of a microprogram control type known in the art.

The first through the n-th peripheral control processors 15 are connected to first through n-th peripheral devices 16-1, 16-2, . . . , and 16-n, respectively. Each of the peripheral devices 16 (suffixes omitted) is labelled "PD" and may be a disk unit, a magnetic tape unit, a display device, or the like. Each of the peripheral control processors 15 is connected to the first diagnostic bus 13 and is operable in a normal state of operation. In the normal state, the peripheral control processors 15 control the respective peripheral devices 16 in the manner known in the art. Each of the peripheral control processors 15 is liable to a failure during progress of the normal state. When the failure occurs, the peripheral control processor 15 is put into a down state.

The failure recovery informing arrangement comprises first through n-th failure occurrence signal producing circuits 17-1, 17-2, . . . , and 17-n which are connected to the first through the n-th peripheral control processors 15, respectively, and to the first diagnostic bus 13. Each of the failure occurrence signal producing circuits 17 (suffixes omitted) is for detecting the downstate of the peripheral control processors 15 connected thereto and for producing a failure occurrence signal indicative of occurrence of the failure of the peripheral control processor 15 connected thereto. The failure occurrence signal producing circuit 17 under consideration thereby delivers the failure occurrence signal to the first diagnostic bus 13.

A diagnostic processor 18 also is of a microprogram control type and is labelled "DGP". The diagnostic processor 18 comprises a detecting portion 19. The detecting portion 19 is connected to the first diagnostic bus 13 and to the system bus 11 for detecting the failure occurrence signal to deliver a detection signal to the system bus 11 upon detection of the failure occurrence signal. In this event, the detecting portion 19 makes the detection signal comprise a processor code of the peripheral control processor 15 subjected to a failure.

An input-output processor 20 is of a microprogram control type and is labelled "IOP". The input-output processor 20 is connected to the system bus 11 and produces a recovery command signal in response to the detection signal to deliver the recovery command signal back to the system bus 11. Such operation of the input-output processor 20 will now be described more in detail.

It will be assumed that a failure occurs in the first peripheral control processor 15-1 and that the first peripheral control processor 15-1 is thereby put into the down state. In this event, the input-output processor 20 sends, with reference to the processor code of the detection signal, a channel abnormality informing signal to a CPU (central processing unit) 21 through the system bus 11. The channel abnormality informing signal informs that the first peripheral control processor 15-1 is subjected to a failure. In other words, the channel abnormality informing signal informs that a channel is abnormal which comprises the first peripheral control processor 15-1.

Responsive to the channel abnormality informing signal, the CPU 21 reads a channel recovery instruction out of a main memory unit 22 labelled "MMU". The channel recovery instruction is for use in recovery of the channel and is called a reset physical channel (RPC) instruction in the art. The CPU 21 subsequently delivers the channel recovery instruction to the input-output processor 20 through the system bus 11.

Responsive to the channel recovery instruction, the input-output processor 20 delivers the channel recovery instruction as the recovery command signal to the diagnostic processor 18 through the system bus 11. Thus, the input-output processor 20 is operable as a recovery command signal producing circuit connected to the system bus 11 for producing a recovery command signal in response to the detection signal to deliver the recovery command signal back to the system bus 11.

The diagnostic processor 18 further comprises a processing portion 23. The processing portion 23 is connected to the system bus 11 and to the first diagnostic bus 13 and processes the recovery command signal into a peripheral initializing signal and a recovery informing signal to deliver the peripheral initializing signal and the recovery informing signal to the first peripheral control processor 15-1 in question.

The peripheral initializing signal is for turning the down state back to the normal state. More specifically, the peripheral initializing signal is for initializing the first peripheral control processor 15-1 to put the first peripheral control processor 15-1 into a reset state and for making the first peripheral control processor 15-1 execute a diagnostic test program to put the first peripheral control processor 15-1 into the normal state. The diagnostic test program will become clear as the description proceeds. The recovery informing signal informs that the down state is turned back to the normal state after occurrence of the failure.

Attention will be directed to the first peripheral control processor 15-1. Although structure and operation will now be described only as regards the first peripheral control processor 15-1, each of other peripheral control processors 15-2 to 15-n is similar to the first peripheral control processor 15-1 in structure and operation.

As mentioned before, the first peripheral control processor 15-1 is of a microprogram control type. The first peripheral control processor 15-1 comprises a memory 24 for preliminarily memorizing the diagnostic test program comprising a succession of microinstructions. The diagnostic test program is known in the art as an initial diagnostic test program or initial test firmware (ITF).

Figure 2:
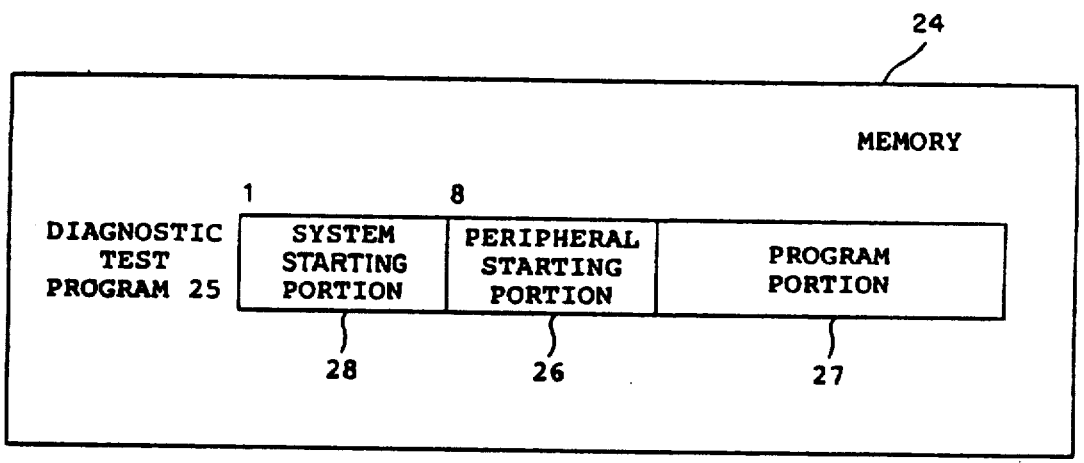
FIG. 2 is a diagram for use in describing operation of a memory which is used in the failure recovery informing arrangement of the data processing system illustrated in FIG. 1.

Turning to FIG. 2, the diagnostic test program is depicted at 25 and comprises a peripheral starting portion 26 and a program portion 27 which follows the peripheral starting portion 26. The diagnostic test program 25 further comprises a system starting portion 28 preceding the program portion 27 and the peripheral starting portion 26. Alternatively, the system starting portion 28 may be arranged in the diagnostic test program 25 with the system starting portion 28 followed by the program portion 27 and with the system starting portion 28 preceded by the peripheral starting portion 26. The system and the peripheral starting portions 28 and 26 are memorized in system and peripheral addresses of the memory 24, respectively. The system and the peripheral addresses are different from each other. In the example being illustrated, the system and the peripheral addresses correspond to first and eighth addresses of the memory 24. The system starting portion 28 will become clear as the description proceeds.

Turning back to FIG. 1, the first peripheral control processor 15-1 further comprises a RAM (random access memory), not shown, and a reading and executing circuit 29 connected to the memory 24, the first diagnostic bus 13, and the RAM. The reading and executing circuit 29 reads the peripheral starting portion 26 (FIG. 2) in response to the peripheral initializing signal. When the peripheral starting portion 26 is read, the reading and executing circuit 29 writes a flag signal of a logic "1" level in the RAM and executes the program portion 27 (FIG. 2). When the program portion 27 is executed, the program portion 27 indicates that the first peripheral control processor 15-1 is turned into the normal state.

The peripheral initializing signal comprises a peripheral starting address signal which indicates the peripheral starting portion 26 by the peripheral address of the memory 24. It should be noted here that the peripheral starting address signal is also used as the recovery informing signal.

After the program portion 27 is executed to an end, the reading and executing circuit 29 carries out judgement whether or not the flag signal is written in the RAM.

When a result of the judgement is affirmative, the reading and executing circuit 29 erases the flag signal from the RAM and supplies, through the local bus 13, the input-output processor 20 with a completion signal which represents complete recovery of the failure. Inasmuch as the first peripheral control processor 15-1 is turned back to the normal state after complete execution of the program portion 27, it is taken for granted that it is possible to use the local bus 13 in supplying the completion signal from the first peripheral control processor 15-1 to the input-output processor 20.

When the result of the judgement is negative, the reading and executing circuit 29 does not carry out the above-mentioned operation.

Responsive to the completion signal, the input-output processor 20 delivers a channel abnormality end informing signal to the CPU 21 through the system bus 11. The channel abnormality end informing signal informs that the channel comprising the first peripheral control processor 15-1 becomes normal. This is the reason why the first peripheral control processor 15-1 has to supply the input-output processor 20 with the completion signal after occurrence of the failure.

The diagnostic processor 18 still further comprises a generating portion 30 for generating a start signal. The generating portion 30 is manually operated by a user of the data processing system in order to start the data processing system. Alternatively, the generating portion 30 is manually or automatically operated in order to deal with a system failure to which the data processing system is liable. When the system failure occurs, each of the peripheral control processors 15 is also put into the down state.

When the start signal is generated, the diagnostic processor 18 initializes the CPU 21 by the use of the second diagnostic bus 14 to put the CPU 21 into a reset state in the manner known in the art. Simultaneously, the diagnostic processor 18 initializes the input-output processor 20 and the main memory unit 22 by the use of the second diagnostic bus 14 to put each of the input-output processor 20 and the main memory unit 22 into a reset state in the manner also known in the art. Thereafter, the diagnostic processor 18 makes each of the input-output processor 20 and the main memory unit 22 execute another diagnostic test program by the use of the second diagnostic bus 14 to put each of the input-output processor 20 and the main memory unit 22 into a normal state. Subsequently, the processing portion 23 of the diagnostic processor 18 processes the start signal into a system initializing signal and a start informing signal. The processing portion 23 is connected for this purpose to the generating portion 30. The processing circuit 23 delivers the system initializing and the start informing signals to the first through the n-th peripheral control processors 15 in a predetermined order through the first diagnostic bus 13.

The system initializing signal is for putting each of the peripheral control processors 15 into the normal state. More specifically, the system initializing signal is for initializing each of the peripheral control processors 15 to put the peripheral control processor 15 into a reset state and for making the peripheral control processor 15 execute the diagnostic test program 25 (FIG. 2) to put the peripheral control processor 15 into the normal state in the manner which will presently be described. The start informing signal informs that each of the peripheral control processor 15 is put into the normal state as a result of generation of the start signal.

For brevity of description, operation will hereinafter be described only as regards the first peripheral control processor 15-1 when the first peripheral control processor 15-1 receives the system initializing and the start informing signals. However, it should be understood that each of other peripheral control processors 15-2 to 15-n is similar to the first peripheral control processor 15-1 in operation. Responsive to the system initializing signal, the reading and the executing circuit 29 of the first peripheral control processor 15-1 reads the system starting portion 28 (FIG. 2) and executes the program portion 27 (FIG. 2) when the system starting portion 28 is read. When the program portion 27 is executed after the system starting portion 28 is read, the program portion 27 indicates that the first peripheral control processor 15-1 is put into the normal state in response to the start signal which is generated either for the purpose of starting the data processing system or for the purpose of dealing with the system failure. The system initializing signal comprises a system starting address signal which indicates the system starting portion 28 by the system address of the memory 24 and is used as the starting informing signal.

While this invention has thus far been described in conjunction with a preferred embodiment thereof, it will readily be possible for those skilled in the art to put this invention into practice in various other manners. For example, this invention is also applicable to a data processing system comprising only one peripheral control processor.

What is claimed is:

1. A failure recovery informing arrangement for use in a data processing system comprising a system bus, a diagnostic bus, and a peripheral control processor connected to said diagnostic bus, operable in a normal state of operation, and put into a down state upon occurrence of a failure, said failure recovery informing arrangement comprising:

failure occurrence signal producing means connected to said peripheral control processor and to said diagnostic bus for producing a failure occurrence signal indicative of occurrence of said failure and for delivering said failure occurrence signal to said diagnostic bus;

a diagnostic processor connected to said system bus and to said diagnostic bus for detecting said failure occurrence signal to deliver a detection signal to said system bus upon detection of said failure occurrence signal; and recovery command signal producing means connected to said system bus for producing a recovery command signal in response to said detection signal to deliver said recovery command signal back to said system bus, said diagnostic processor further processing said recovery command signal into a peripheral initializing signal and a recovery informing signal to deliver said peripheral initializing signal and said recovery informing signal to said peripheral control processor, said peripheral initializing signal being for turning said down state back to said normal state, said recovery informing signal informing said peripheral control processor that said down state is turned back to said normal state as a result of occurrence of said failure.

2. A failure recovery informing arrangement as claimed in claim 1, wherein said peripheral control processor
preliminarily memorizes a diagnostic test program which comprises a peripheral starting portion and a program portion following said peripheral starting portion,
said peripheral control processor reading said peripheral starting portion in response to said peripheral initializing signal and executing said program portion when said peripheral starting portion is read, said program portion indicating, when executed, that said peripheral control processor is turned into said normal state.

3. A failure recovery informing arrangement as claimed in claim 2, wherein said peripheral initializing signal comprises a peripheral starting address signal which indicates said peripheral starting portion and is used as said recovery informing signal.

4. A failure recovery informing arrangement as claimed in claim 2, wherein said diagnostic processor further generating and processing a start signal into a system initializing signal and a start informing signal and further delivering said system initializing signal and said start informing signal to said peripheral control processor, said system initializing signal being for putting said peripheral control processor into said normal state, said start informing signal providing information that said peripheral control processor is put into said normal state as a result of generation of said start signal.

5. A failure recovery informing arrangement as claimed in claim 4, said data processing system being liable to a system failure, said peripheral control processor being put into said down state upon occurrence of said system failure, wherein:
said diagnostic test program includes a system starting portion preceding said program portion;
said peripheral control processor being for reading said system starting portion in response to said system initializing signal and for executing said program portion when said system starting portion is read, said program portion indicating, when executed after said system starting portion is read, that said peripheral control processor is put into said normal state in response to said start signal which is generated in order to deal with said system failure.

6. A failure recovery informing arrangement as claimed in claim 5, wherein said system initializing signal comprises a system starting address signal which indicates said system starting portion and is used as said start informing signal.

* * * * *